A = MATRIX CONTENT 30% BY WEIGHT
B = MATRIX CONTENT 40% BY WEIGHT
C = MATRIX CONTENT 67% BY WEIGHT

A = AMBERLITE IRA-93/ZEO-KARB 226 STIRRED AT 1370 RPM
B = AMBERLITE IRA-93/ZEO-KARB 226 STIRRED AT 530 RPM
C = DE-ACIDITE G/ZEO-KARB 226 STIRRED AT 530 RPM

A=DE-ACIDITE G(10-20μ)/ZEO-KARB 226(-10μ)
B=DE-ACIDITE G(-10μ)/ZEO-KARB 226(-10μ)
C=AMBERLITE IRA-93(ca 1μ)/ZEO-KARB 226(-10μ)
D=DE-ACIDITE G/ZEO-KARB 226-BOTH 14-52 MESH BSS

United States Patent Office 3,645,922
Patented Feb. 29, 1972

3,645,922
ION-EXCHANGE RESINS
Donald Eric Weiss, Blackburn, Victoria, Brian Alfred Bolto, Mitcham, Victoria, and Donald Willis, Blackburn, Victoria, Australia, assignors to Commonwealth Scientific and Industrial Research Organization, East Melbourne, Victoria, Australia
Filed Nov. 22, 1968, Ser. No. 778,154
Claims priority, application Australia, Nov. 22, 1967, 30,165/67
Int. Cl. C08f 29/30, 29/36, 29/50
U.S. Cl. 260—2.1 R        30 Claims

ABSTRACT OF THE DISCLOSURE

Composite ion exchange adsorbent in particulate form comprising particulate acidic and basic ion exchange materials dispersed in a homogeneous matrix of a water-insoluble and ion-permeable polymeric material, preferably poly (vinyl alcohol). Such adsorbents may be made by dispersing the ion exchange materials in a solution of the polymeric material in a solvent, dispersing the dispersion in a medium immiscible with the solution, and removing at least a part of the solvent. The adsorbent is particularly suitable for use in the demineralisation of salt solutions.

---

Figure 1:
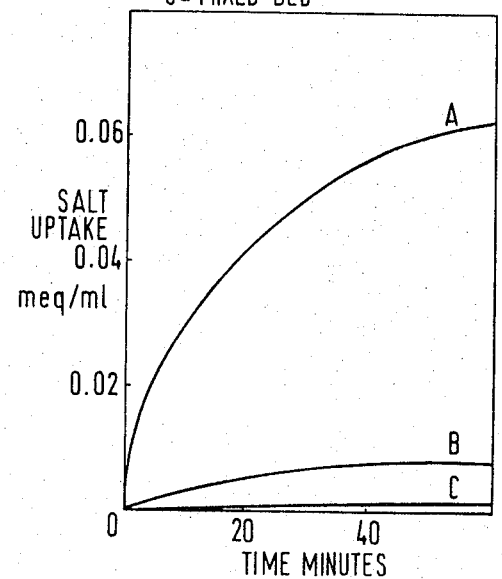

This invention is concerned with ion exchange processes and adsorbents, and it seeks to provide a particulate ion exchange adsorbent which will combine the exchange efficiencies of fine particle resins with the handling advantages of a coarse particle adsorbent. The present invention has particular application in the so-called Sirotherm process described in our Australian Pat. No. 274,029 and our Australian patent application No. 59,441/65.

The use of ion exchange resins of fine particle size (i.e. less than 70 mesh BSS or 200 microns) is obviously advantageous since the increased surface area per unit volume provides increased reaction rates and more effective resin usage. However, the use of fine resins in commercial ion exchange processes has been precluded largely because of mechanical difficulties associated with the handling and retention of the resin within the equipment concerned. Fine particle adsorbents beds not only create excessive pressure drops and are prone to clogging and fouling, but they are extremely difficult to backwash effectively owing to the ease with which the fine particles become entrained with the backwashing liquor. The general problem of resin loss by entrainment and fine particle elutriation is critical in some continuous ion exchange processes where the liquor and the adsorbents must be intimately contacted at one stage but must be otherwise handled separately. Consequently, although very fast reaction rates and efficient resin utilization is theoretically available through the use of fine particle resins, commercial ion exchange systems typically employ particle sizes in the range of 30 to 50 BSS mesh (i.e. larger than 300 microns).

In the Sirotherm process referred to above, salt solutions are partially demineralised by a mixture of weak acid and weak base resins which are regenerated thermally. Fine particle kinetics are particularly desirable since although the equilibrium of the adsorbent mixed bed is in some situations very favorable to salt adsorption, the rate of adsorption is low. This is because the adsorption of salt involves the transfer of protons from the weak acid adsorbent to the weak base adsorbent. The reaction rate is adverse because proton concentration is low compared with that of salt in the salt solution.

Our investigations of this process have shown that because of low adsorption rates the process generally cannot be operated economically with standard size (300 to 1200 microns) resins. However, much faster rates of reaction occur if the resin particle size is reduced from the usual range of 300 to 1200 microns to, for example, 10 to 20 microns or even less, thereby reducing the diffusion path for protons between the acid and base adsorption sites; but the mechanical problems of handling such finely divided adsorbents are severe. A number of possible prior solutions to this difficulty have been considered but have not been found to be satisfactory. The most promising of these proposals are briefly discussed below.

One method which has been proposed to achieve reduction of the diffusion path for the protons between adsorption sites while avoiding the complications inherent in the use of finely divided resins, involves the use of the so-called ion retardation resins. The latter have been used in the demineralisation of sugar solutions and consist of an amphoteric resin containing for example strong base groups such as quaternary ammonium groups or weak base groups such as tertiary amine groups and nearby weak acid groups such as carboxyl groups. These resins sometimes known as "ampholytes" adsorb salt which may be subsequently removed by elution with water. The ampholytes are prepared in general by impregnating an anion exchange resin with an acid monomer, such as acrylic acid, which is then polymerised in situ to form long chains of linear polymer intertwined within the anion exchange resin to form a so-called "snake cage" resin. However, owing to the close proximity of the positively and negatively charged sites in such resins there is a strong tendency for self neutralisation of the ionic charges to occur by ion pair formation so that there are relatively few charged sites which are sufficiently far apart for the adsorption of salt to occur. The capacity of such resins is thus very low. Furthermore, again because of the proximity of the exchange sites it is necessary to have approximately equal numbers of acidic and basic sites. A significant excess of one type of site will bring about repulsion of ions of the same charge entering the resin thus inhibiting the rate of ion-exchange. This is contrary to the teaching of our said patent application which shows that optimum performance of the Sirotherm process may depend on the use of resin ratios far removed from unity.

Another prior art proposal involved the incorporation of finely divided ion exchange resins into papers, e.g. filter papers by combining the resins with a paper pulp and forming the paper in the usual way. However, the poor mechanical properties of paper bodies make them quite unsuitable for ion exchange processes involving adsorbents in particulate rather than sheet form.

In the prior art it is also known to produce so-called "heterogeneous" ion exchange membranes by incorporating particles of an ion exchange resin into a water impermeable matrix of waxy or polymeric materials (see for example Ion Exchange, F. Helfferich, McGraw-Hill 1962, p. 341). The function of the matrix is to hold the ion exchange particles in place and to ensure that the passage of water and/or ions through the membrane occurs only by way of the ion exchange particles themselves. For this reason it is also essential that in such membranes the particles of ion exchange material must be in contact with each other and at least some of them must be in direct contact with the medium contacted by the membrane.

Finally, it was suggested (by Stine et al. in U.S. Pat. No. 3,231,492) that composite ion exchange particles could be made by incorporating particles of anion and cation exchange resins in such a matrix. Here again however ion migration through the composite is achieved through particle to particle contact and the overall rate of salt adsorption and desorption during regeneration will be slow if standard size composite particles are employed.

In contrast to the prior art proposals, it is now proposed to provide composite ion exchange particles incorporating finely divided ion exchange resins within a water and ion permeable matrix and which offer the rate advantages appropriate to much smaller particles. Provided the matrix is highly permeable to water and particularly ions, very good kinetics can be achieved by the use of ion exchange particles of latex or colloidal dimensions.

In one aspect, therefore, the present invention provides a composite ion exchange adsorbent in particulate form comprising particulate acidic and basic ion exchange materials dispersed in a homogeneous matrix of a water-insoluble and water-and ion-permeable polymeric material.

By "homogeneous" we mean a material of substantially uniform chemical composition and physical continuity, i.e. composed of a single mass of material, rather than a physical agglomeration of smaller bodies, such as particles, fibres or the like. Nevertheless, the matrix materials may contain voids or pores. For example, it may have a degree of porosity such as that encountered in so-called "macroporous" ion exchange resins.

Preferred matrices in accordance with the invention comprise three-dimensionally cross-linked polymeric materials which are water-insoluble and permeable to water and ions.

It is preferable in accordance with the present invention to ensure as far as possible that the matrix material completely encapsulates the particles of the ion exchange materials. It is also desirable that as far as possible the individual particles are separated from each other by the matrix material.

The matrix materials for the adsorbents comprising this invention should combine adequate mechanical toughness with high permeability to the ions which are to be removed from a solution treated with the composite adsorbent. The degree of mechanical strength required will depend on the type of handling the adsorbent will be subjected to in use. In the Sirotherm ion exchange process the solution to be treated will comprise water and soluble salts and a strongly polar material is therefore preferred. The matrix should also be stable to the repeated thermal cycling inherent in the Sirotherm process.

The preferred matrix materials in accordance with this invention comprise substantially homogeneous, three-dimentionally cross-linked polymeric material consisting essentially of polymer chains having approximately equal numbers of anionic and cationic sites and/or a high concentration of polar but unionized functional groups.

Expressed in another way, the polymer chains have X anionic sites, Y cationic sites and Z polar but unionized sites where X and Y are selected so that the net charge of all of the sites is approximately zero provided that Z is not zero if both X and Y are zero.

It is found that materials particularly suited to this purpose are those selected from the class consisting of ionically cross-linked polyelectrolytes and cross linked polymers having a predominance of neutral hydrophilic functional groups. Preferred functional groups are hydroxyl groups or functional derivatives thereof such as, for example, ethers.

We have found that the material which best satisfies these requirements is a cross-linked poly (vinyl alcohol).

There are many known reagents for cross-linking poly (vinyl alcohol) by reaction with some of the pendant hydroxyl groups and these include: formaldehyde and other aldehydes, in particular dialdehydes such as terephthalaldehyde and glutaraldehyde; dimethylol urea, tetrabutyl titanate; bis-3-methoxy propylidene, pentaerythritol; diazonium and tetrazonium salts, boric acid. Poly (vinyl alcohol) may also be cross-linked by radiation. Other reagents which might be used are those known to cross-link cellulose, e.g. N-methylol and M-methylol ether derivatives of amines, amides and ureas, such as dimethylol dihydroxy ethylene urea and ethyl N,N-dimethylol carbamate; diepoxides such as diglycidyl ether; ethyleneimine derivatives such as tris-(1-aziridinyl) phosphine oxide; divinyl sulphone and bis-(2-hydroxyethyl) sulphone; epichlorhydrin; phosgene and diacid-dichlorides; and 4,5-dihydroxy-1,3-dimethyl-2 - imidazolidinone. Composite adsorbent in accordance with this aspect of the invention may be prepared by forming a dispersion of the ion exchange materials in a medium comprising the poly (vinyl alcohol) and a suitable solvent system and then bringing about cross-linking e.g. by addition of a cross-linking agent, if necessary in the presence of a catalyst, or by irradiation or other techniques known per se.

A cross-linked polyvinyl alcohol matrix may also be prepared by polymerising vinyl acetate and a compatible cross-linking agent such as triallyl cyanurate, the divinyl ether of butane-1,4-diol or the triallyl ether of pentaerythritol, in the presence of the ion exchange adsorbents and subsequently hydrolysing the acetate with hot alkali.

The degree of cross-linking has considerable influence on the mechanical strength of the matrix and the maximum size of ions which are passed by the matrix. For matrices of poly (vinyl alcohol) cross-linked with glutaraldehyde the optimum degree of cross-linking is provided by an amount of glutaraldehyde equivalent to between about 20 and 60 mol. percent of the free hydroxyl groups of the poly (vinyl alcohol). The preferred cross-linking agents are those which provide cross-links which are not too flexible. Preferred agents in this regard are glutaraldehyde, terephthalaldehyde and formaldehyde. For the direct production of composite adsorbents in bead form according to the preferred methods of this invention, it is desirable to have a water-soluble cross-linking agent, and glutaraldehyde, therefore, is especially preferred.

The mechanical strength of cross-linked poly (vinyl alcohol) matrices may be further enhanced by heating the cross-linked polymer at a temperature between 130–150° C. or by further reaction with a cross-linking agent such as formaldehyde, glutaraldehyde, glyoxal or terephthalaldehyde.

Polyelectrolytes suitable for use as matrix materials in accordance with this invention are described in the literature (A. S. Michaels et al., J. Phys. Chem., 69, 1447, (1965), J. Phys. Chem. 65, 1765, (1961), R. M. Fuoss and M. Sadek, Science, 110, 552, (1949). These materials are complexes consisting of polyanionic and polycationic materials cross-linked by ionic interaction between the oppositely charged anionic and cationic sites of the two materials. Usually about two thirds of the charged sites mutually interact and form strongly polar cross-links.

The remaining charged groups interact with salt and other electrolytes such as acids or alkalis and thereby confer a high electrolyte permeability which may be controlled by adjusting the ratio of anionic to cationic sites. Maximum electrolyte permeability occurs when the complex is electrically neutral and decreases as the complex acquires either a net positive or negative charge. Thus, varying the ratio of the polyanionic to polycationic sites provides a simple way of controlling the surface charge and the permeability to small electrolytes.

The complexes may be prepared from a wide range of cationic and anionic polyelectrolytes. Those containing cationic groups include poly (vinylbenzylamine) and N-substituted derivatives thereof, polyethyleneimine and N-substituted derivatives thereof, polyvinylpyridine, poly (dimethylaminoethyl methacrylate), quaternised poly (dimethylaminoethyl methacrylate) and quaternised polyvinylpyridine. Polymers having suitable anionic groups include sodium poly (styrenesulphonate), sodium poly (vinyltoluenesulphonate), sodium polyacrylate, sodium polymethacrylate, sodium salts of the hydrolysed copolymers of styrene and maleic anhydride, sodium polyvinylsulphonate, and the corresponding water soluble free acids, as well as the corresponding salts of other alkali metals.

It is also possible to produce certain polyelectrolytes of the above type which have some covalent as well as ionic cross-links. Such materials are also useful as matrices in accordance with this invention.

In general the mechanical strength of the polyelectrolyte matrices increases with increasing molecular weight and degree of substitution which determines the degree of cross-linking and therefore polyelectrolytes of relatively high molecular weight and degree of substitution are preferred.

Using these materials, composite adsorbents in accordance with this invention may be prepared by forming a solution of the polyanionic-polycationic complex in a ternary solvent consisting of an aqueous sodium bromide and a polar solvent such as dioxane or acetone, as described by Michaels op. cit., and formed into a slurry with the finely divided ion exchange material. The slurry is then dispersed in an oil phase and the organic solvent removed thus depositing the matrix as a film around the particles. This technique will also be described in more detail hereinafter.

Other materials which may be useful as matrices include cellulose derivatives such as cellulose acetate, cellulose triacetate, methyl cellulose, ethyl cellulose, hydroxyethyl cellulose, cellulose nitrate, as well as regenerated cellulose formed by acid treatment of a cellulose xanthate matrix.

For the reasons already stated above the composite adsorbents of the present invention are preferably in the same form and particle size as "standard" ion exchange adsorbents, i.e. approximately spherical particles of about 300 to 1200 microns average diameter. However useful composite adsorbents may be made in particles as small as 50 microns or as large as 200 microns.

To achieve adequate mechanical strength of the composite particles and economical use of matrix materials the ion exchange materials incorporated in the matrix will preferably have a particle size some $\frac{1}{10}$ to $\frac{1}{1000}$ of that of the composite adsorbent particle.

The optimum size of the particles of the ion exchange materials will be determined by several factors, including the activity of the materials, the permeability of the matrix and size of the composite particles. For example, for a matrix of high ionic permeability the particle size of the ion exchange material will largely determine the kinetics of the composite particle and thus the ion exchange material should be as finely divided as possible. In general, the lower limit for the particle size of the ion exchange materials will be set only by the availability of such materials in a suitably finely divided state.

However, for particles below 0.01 micron, interaction between anionic and cationic sites may become substantial.

Ion exchange resins with particle sizes of about 30 to 60 microns are now well known and resins have recently been produced in the 0.5 to 1.5 micron particle size range. However, smaller particles than these can be used if desired. The upper limit for the particle size of the ion exchange materials will be largely determined by the kinetics of the particlar materials involved but with presently available ion exchange resins the advantages of the new composite materials will not be realised with dispersed resins of more than about 50 microns particle size.

Again for reasons of mechanical strength and thermal stability the composite particles preferably contain not more than about 70% by weight of the ion exchange materials. For a poly (vinyl alcohol) matrix the upper limit is best set at about 60% by weight.

The nature of and criteria for selection of the weak acid and weak base ion exchange materials for use in composite adsorbents for the Sirotherm process have been described at length and in detail in our above mentioned patent and patent application and will not be further discussed here. Some suitable materials are as follows.

| Weak base resins: | Weak acid resin |
|---|---|
| De-Acidite G | Zeo-Karb 226. |
| Amberlite IRA-93 | Amberlite IRC-84. |
| Amberlite XE-257, Ultrafine | Amberlite IRC-50. |
| | Amberlite XE-256, |

("De-Acidite," "Amberlite" and "Zeo-Karb" are registered trademarks). De-Acidite G is a weak base, tertiary

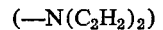

groups only polystyrene resin. Amberlite IRA-93 is a macroreticular weak base tertiary amine resin with a macroporous polystyrene-divinyl-benzene matrix. Amberlite XE-257 is a macroreticular weak base (tertiary amine) resin. Zeo-Karb 226 is a cross-linked methacrylic acid resin. Amberlite IRC-84 is a cross-linked acrylic acid. Amberlite IRC-50 is a methacrylic acid resin cross-linked with divinylbenzene. Amberlite XE-256 is a macroreticular, ultrafine weakly acidic carboxyl resin.

As discussed in patent application No. 59,441/65 the molar ratio of acid to base resins is critical and may in many cases be substantially different from an equimolar ratio. It will be apparent that the composite adsorbents of this invention may be made with any desired acid/base resin ratio, and no limitation thereon is contemplated by this invention.

It has been observed in the Sirotherm process that for a given particle size the rate of release of protons from the weak acid resin is usually greater or less than the rate of uptake of the protons by the weak base resin. This effect tends to give rise to local changes in the pH within the composite adsorbent which in turn will produce less than optimum performance for the adsorbent for the reasons discussed in the said patent application. It is therefore desirable in the practice of the present invention to minimise this effect by matching the rates of exchange of the two ion exchange particles, either by use of a smaller particle size for the slower resin or a more porous resin of the same particle size.

The composite adsorbents of this invention are also useful in processes using mixed acidic and basic resins which are not thermally regenerated as in the Sirotherm process but are regenerated with water at ordinary temperatures. Such processes are applicable to the sugar industry for the deminersalisation of sugar solutions.

Australian patent application No. 20,648/67 describes the preparation of finely divided ion exchange resins having magnetic properties which enable the particles to be easily handled and backwashed by employing magnetic handling techniques. Composite absorbents in accordance with this invention may also be made in magnetic form by embedding inert magnetic particles along with the adsorbent particles in the matrix.

A weighted composite ion exchange adsorbent material is also advantageous in that because of its high specific gravity it can be used in mixer-settler type continuous processes (e.g. using cyclone separators) or processes involving reverse flow regeneration. With the usual ion exchange resins the specific gravity is in the range 1.1 to 1.2 so that the fluidisation velocity is impracticably low and complicated devices must be utilised to hold the bed in position. If, however, a weighted composite adsorbent is used (a specific gravity of 1.5 to 1.7 can be readily achieved) practical upflow velocities for regeneration can be utilized without fluidising the bed. A variety of substances can be used for weighting the the adsorbents such as titanium dioxide, zirconium dioxide, stannic oxide, lead sulphide and other natural or synthetic heavy materials.

An important technical problem in the demineralisation of surface and some other waters is that fulvic acids and related negatively charged colloids tend to adsorb onto the surface of ion exchange adsorbents and inhibit their adsorption properties. Such anionic colloids do not adsorb onto the surface of negatively charged adsorbents.

It is within the scope of the present invention to provide composite adsorbents in which the matrix surface is either electrically neutral or has a small net negative charge so that negatively charged colloids are not adsorbed onto the surface. This may be done by either grafting a small amount of an anionic material onto the surface of the composite particle in the case of poly (vinyl alcohol) matrices or, in the case of polyelectrolyte matrices, by ensuring that the polyanionic portion of the matrix is present in a slight excess.

The invention will be further elucidated and the preparation, properties and applications of a number of composite adsorbents in accordance with the invention will now be described by way of example. It is to be understood that the invention is not limited by the given examples.

The following registered trademarks are used in the course of the description: "Primafloc," "Purifloc," "Glyco," "Zeo-Karb," "De-Acidite," "Ondina," and "Elyanol."

EXAMPLE 1.—PREPARATION AND PROPERTIES OF COMPOSITE ADSORBENTS BASED ON CROSS-LINKED POLY (VINYL ALCOHOL) MATRICES (METHOD A)

(a) Composite adsorbent beads containing ion exchange particles embedded in a cross-linked poly (vinyl alcohol) matrix were prepared by mixing the particles with an acidic solution of poly (vinyl alcohol), together with an amount of glutaraldehyde calculated to react with 20% of the hydroxy groups in the polymer and dispersing the mixture in paraffin oil by stirring. The acidic conditions catalyse the reaction of the dialdehyde with the polymer and solid beads are formed from the droplets of the aqueous reaction mixture containing the ion exchange particles. This example describes composite beads having a matrix content of about 40% by weight.

The poly (vinyl alcohol) solution was prepared by dissolving 24.6 g. of a low molecular weight 88% hydrolysed poly (vinyl acetate) such as "Gelvatol 20–30" (Monsanto) in 169 ml. of water and adjusting the pH of the solution to 1.4 by the addition of 1 N hydrochloric acid. The ion exchange materials employed consisted of an amine resin of the "De Acidite G" (21.5 g. of the hydrochloride form having a capacity of 3.55 meq./g.) and a carboxylic acid resin of the "Zeo Karb 226" type (20.8 g. of the free acid form having a capacity of 9.2 meq./g.). Both resins had been crushed to a particle size of $10\mu$ or less. The ratio of acidic to basic sites is 2:5 as required for the optimum performance of these two resins in a thermal regeneration process.

The mixed resins were ball milled for 16 hours in 400 ml. of dilute hydrochloric acid having a pH of 1.4. The particles were filtered off and sucked dry on the Buchner funnel for 15 min. The filter cake was then added to the acidic poly (vinyl alcohol) solution and stirred until a uniformly mixed slurry resulted. To it was added 11.3 ml. of a 25% glutaraldehyde solution and after 2 min. of rapid mixing the whole was added to 1.8 l. of paraffin oil (Shell "Ondina 33"). Dispersion of the aqueous slurry was achieved by stirring with a 2 in. diameter serrated disc stirrer rotated at 700 r.p.m. The globules of the aqueous solution containing the ion exchange particles set firm after about 12 min. Stirring was maintained for 1 hour at ambient temperature (ca. 20° C.) followed by 2 hours at 60° C. but at the reduced stirring rate of 400 r.p.m. The cooled product was filtered off, washed with hexane to remove the oil, and with acetone to remove the hexane. Four alternate washings were carried out with each solvent, followed by four with water and two with acetone. The product was cured in an air oven at 105° C. for 90 min. The hard free-flowing beads which resulted were predominantly (91%) in the 14–100 mesh BSS size range. They were spherical in shape and contained all the ion exchange particles embedded in a cross-linked poly (vinyl alcohol) matrix.

(b) The rate of salt uptake by the thermally regenerated composite adsorbent is shown in FIG. 1. The adsorbent was first washed in a column with 2 N hydrochloric acid, followed by 0.3 N caustic soda and water and then equilibrated to pH 5.8 in 1000 p.p.m. saline. This represents the optimum conditions for the ion exchange materials present in the composite for the operation of a thermally regenerable process. The beads were then column washed with distilled water at 80° C. until the effluent had a conductivity of 8 micro mho cm.$^{-1}$. The regenerated adsorbent (ca. 5 ml.) was then stirred in 150 ml. of 0.02 N sodium chloride and the rate of uptake of salt by the resin determined. Also shown in FIG. 1 are the rates obtained with a conventional mixed bed of the resins "De-Acidite G" and "Zeo-Karb 226" and a snake-cage resin made from "De-Acidite G" cages incorporating poly (acrylic acid) snakes. All resins have a bead size of 14–52 mesh BSS. It can be seen that the composite adsorbent adsorbs salt at a much greater rate than either the comparable mixed bed or a snake-cage resin of analogous structure. The presence of the inert matrix in the composite adsorbent is responsible for its effective capacity (0.12 meq./ml.) being less than that of the mixed bed of standard size resins (0.23 meq./ml.). The value for the snake-cage resin is very low (0.007 meq./ml. because of the internal neutralisation of the acidic and basic sites, made possible by the close proximity of the sites to one another.

(c) Column operation demonstrating a thermally regenerable system was carried out by equilibrating 135 ml. of the composite resin in 100 p.p.m. saline to various pH values. The resin was then packed in a column where cold (ca. 20° C.) and hot (80° C.) solutions of 1000 p.p.m. saline were alternately passed down the column through the bed of resin at a flow rate of 0.6 gal./cu. ft./min. Salt was adsorbed during the cold cycle, which occupied 20 to 50 min. depending on the pH level, and released during the hot cycle, which occupied 20 to 30 min. The operation was carried out according to the principles disclosed in Australian Pat. No. 274,029 and patent application No. 59,441/65, to yield the following results.

| pH of product water: | Effective capacity of composite resin meq./ml. |
| --- | --- |
| 4.8 | 0.016 |
| 5.4 | .032 |
| 5.9 | .036 |
| 6.2 | .023 |
| 6.4 | .010 |

Figure 2:
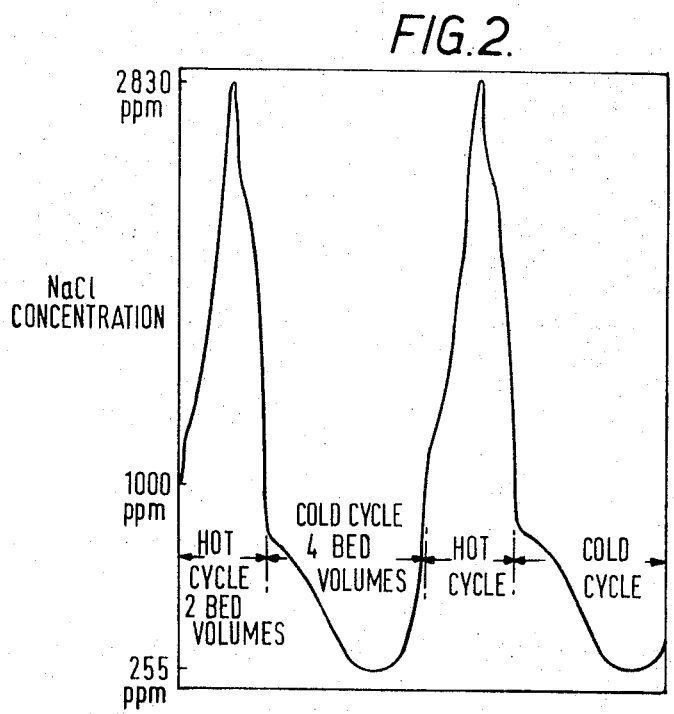

The results indicate that the performance of the composite resin is dependent on the pH of the system, as outlined in the aforementioned patent and patent application with the optimum performance being obtained when the pH of the product water is about 5.9. The behavior of the system under this pH condition is illustrated in FIG. 2.

The column was operated using higher flow rates for the case when the pH of the product water was 5.4. The effective capacity of the column remained unchanged at 0.032 meq./ml. for flow rates of 0.6, 0.9 and 1.3 gal./cu. ft./min.

This example indicates how a composite adsorbent in accordance with this invention can be used to replace a mixed bed of weak acid and weak base resins in the Sirotherm process and how much replacement allows the achievement of practical flow rates and exchange capacities in such a process.

EXAMPLE 2.—EFFECT OF THE QUANTITY OF MATRIX ON THE PROPERTIES OF COMPOSITE ADSORBENTS CONTAINING CROSS-LINKED POLY (VINYL ALCOHOL).

Composite adsorbents were prepared according to the details of Example 1, but with a variation in the quantity of matrix present. The effective capacities of the adsorbents after thermal regeneration as in Example 1 and the mechanical strength of the composite beads are given in Table 1.

TABLE I

| Matrix content, wt. percent | Bulk density, g./ml. | Effective capacity | | Time to first resin breakup in attrition test at— | |
|---|---|---|---|---|---|
| | | meq./g. | meq./ml. | 20° C. | 80° C. |
| Nil | 0.33 | 0.70 | 0.23 | | |
| 20 | | | | 1 hour | |
| 30 | .25 | .49 | .10 | 24 hours | |
| 35 | .27 | .46 | .10 | 24 hours | |
| 40 | .31 | .42 | .12 | 16 weeks | 8 hours. |
| 67 | .29 | .29 | .06 | 9 weeks | 40 hours |

As shown in Table I mechanical strength of the composite beads was markedly inferior when tested at 80° C. instead of ambient temperature, even when the matrix content was increased to 67 wt. percent.

The mechanical strength can be improved, however, by further treatment of the composite beads as follows.

A composite adsorbent having a matrix content of 40 wt. percent poly (vinyl alcohol) cross-linked with glutaraldehyde was reacted in the proportions of 0.5 g. of the resin with 1.5 mole of an aldehyde in a solution of 7 g. of sodium chloride in 60 ml. of 1 N hydrochloric acid at 70° C. for 5 hours. The resulting improvement in the mechanical strength of the beads is illustrated in Table II which also shows the results obtained by a simple heat treatment.

TABLE II.—ATTRITION TESTS AT 80° C. OF COMPOSITE ADSORBENT—PARTICLE SIZE: 52-100 MESH BSS

| Treatment of composite adsorbent | Approximate percent breakup after— | |
|---|---|---|
| | 1 day | 3 days |
| None | 60–70 | 100 |
| Formaldehyde [1] | 5 | 5–10 |
| Glyoxal | 5 | 60–70 |
| Glutaraldehyde | 50 | 95 |
| Terephthaldehyde | 10–20 | 80 |
| Heat treatment (150° C.) | 10 | 50 |

[1] With 15 mmol. of the aldehyde.

It will be seen that treatment with formaldehyde or heat treatment are the most effective. The mechanical strength of the matrix can also be improved by a factor of up to 4 by carrying out the curing stage of the normal preparation (Example I) in a strongly acidic environment.

For comparison, in attrition tests carried out on 14–52 mesh BSS commercial ion exchange resins at 80° C., some resins showed no attrition after 3 days but others showed up to 50% attrition.

The attrition tests were performed using ca. 1 ml. of resin immersed in 10 ml. of water in a "Clinbritic" bottle of capacity 30 ml. to which was added 3 glass beads of 0.25 in diameter. The sealed bottle was rotated end-over-end at 15 r.p.m. in an air oven at 80° C. Break up of of the resin beads was determined by microscopic examination.

The effective capacities were measured using ca. 5 ml. of the adsorbent in 75 ml. of 0.01 N saline.

Figure 3:
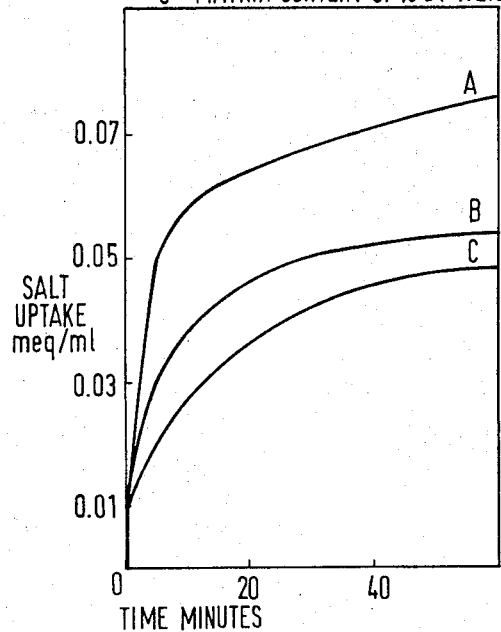

The rate of salt adsorption by the thermally regenerated composite adsorbents like the effective capacity increases with a decrease in the matrix content, as shown in FIG. 3 for beads of 14–52 mesh. This suggests that the matrix provides a resistance to the diffusional path of the ions but an experiment with a composite adsorbent having a matrix content of 67 wt. percent shows that matrix resistance is not a dominating barrier. Thus a sieved 24–52 mesh BSS fraction of dry beads adsorbed salt only 35% faster than a 14–24 mesh BSS fraction, even though the mean swollen bead diameters were 380$\mu$ and 1070$\mu$ respectively.

EXAMPLE 3.—PROPERTIES OF COMPOSITE ADSORBENTS CONTAINING CROSS-LINKED POLY (VINYL ALCOHOL) MATRICES AND VARIOUS ION EXCHANGE PARTICLES

Figure 4:
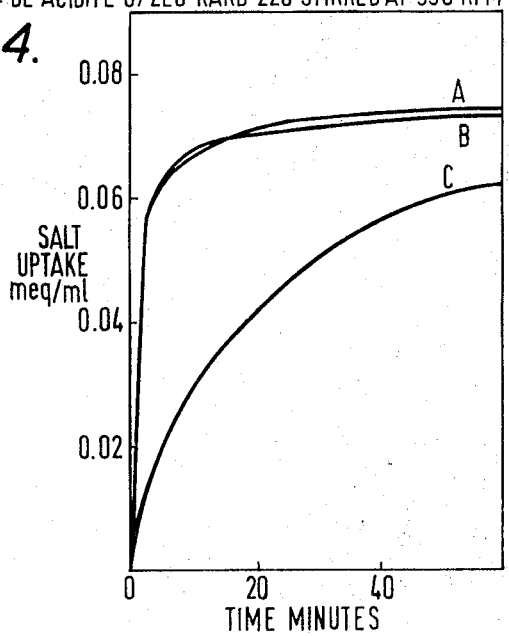

Composite adsorbent beads were prepared as in Example 1 except that the amine resin "Amberlite IRA-93" ca 1$\mu$ size particles was used instead of "De-Acidite G" particles of size $-10\mu$ in combination with carboxylic acid resin particles of the "Zeo-Karb 226" type of size $-10\mu$. The total matrix content was 40 wt. percent. There is a substantial improvement in the rate of salt uptake by 14–52 mesh BSS sized beads of this composite, as shown in FIG. 4. This increase is believed to be a result of both the smaller particle size of the "Amberlite IRA-93" and also its greater porosity relative to the "De-Acidite G" employed in Example 1. The effective capacity of the faster system is also greater, being increased from 0.12 meq./ml. to 0.16 meq./ml.

The stirring speed during the adsorption rate experiments was normally 530 r.p.m. When the stirring speed was increased to 1370 r.p.m., the rate of salt uptake by the "Amberlite IRA-93"/"Zeo-Karb 226" composite adsorbent remained essentially unaltered as is also illustrated in FIG. 4. The lack of a dependence of rate of adsorption on stirring speed indicates that the rate determining step is not the diffusion of ions through the static film of solution around each bead but rather the diffusion of ions through the ion exchange particles themselves, together with any resistance provided by the matrix as mentioned in Example 2.

Assuming that the main diffusional barrier is provided by the ion exchange particles themselves, it is desirable that the two ion-exchange materials incorporated within the composite beads exchange at about the same rate, since otherwise there will be a change in pH during the adsorption stage.

Figure 5:
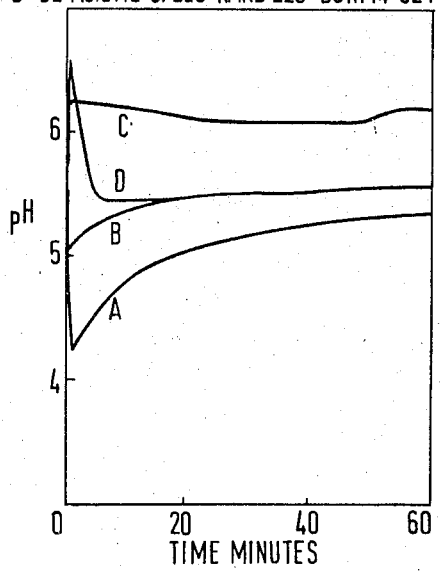

FIG. 5 shows the variation of pH during static adsorption resins using thermally regenerated composite adsorbents of 14–52 mesh BSS bead size, containing different ion exchange resin components. The three composite adsorbents shown have carboxylic acid resin components of the "Zeo-Karb 226" type less that 10$\mu$ in size. When the amine resin component is "De-Acidite G" there is a decrease in the pH of the system as adsorption proceeds, the change being more marked when the anion exchange particles are 10–20$\mu$ in size than when they are less than 10$\mu$. This suggests that the amine resin particles are adsorbing at a slower rate than the carboxylic acid resin particles. When the amine resin component is "Amberlite IRA-93," which is both inherently faster and also of smaller particle size than the "De-Acidite G" the change is in the reverse direction, but of a much smaller magnitude. Here the amine resin component is now slightly faster than the carboxylic acid resin component with the anion and cation exchange components being almost matched as regards their rates of exchange.

Also shown in FIG. 5 is the result obtained for a mixed bed of "De-Acidite G" and "Zeo-Karb 226" resins of 14–52 mesh BSS particle size thermally regenerated as for the composite adsorbents. Here the amine resin exchanges much more rapidly than the carboxylic acid resin.

The preferred systems in accordance with this invention are those in which the ion exchange species adsorb at comparable rates as in the composite adsorbent containing "Amberlite IRA-93" and "Zeo-Karb 226."

EXAMPLE 4.—MAGNETIC COMPOSITE ADSORBENT HAVING A CROSS-LINKED POLY (VINYL ALCOHOL) MATRIX

Since the mechanical strength and the rate of adsorption of salt by a composite adsorbent are enhanced if the size of the composite resin beads is decreased it is advantageous to use them in a more finely divided form than usual, e.g. 100 mesh. The mechanical problems of handling the very small composite beads can then be overcome by making use of their magnetic properties, as described in Australian patent application 20,648/67 and illustrated by the following example.

A magnetic composite adsorbent having a cross-linked poly (vinyl alcohol) matrix was prepared as described in Example 1, except that in addition to the ion exchange particles, gamma iron oxide was added to the reaction mixture in the aqueous phase, the weight ratio of ion exchange particles to matrix to magnetic material being 2:2:1.

The rate of settling of 14-100 mesh BSS beads of the composite can be greatly accelerated by converting it to a magnetised form. This is illustrated by the following settling times which were required for 17.2 ml. of composite adsorbent in 133 ml. of water to settle out after being thoroughly agitated.

| | Sec. |
|---|---|
| Unmagnetised resin | 64 |
| Magnetised resin | 15 |
| Demagnetised resin | 55 |

EXAMPLE 5.—REGENERATION OF COMPOSITE ADSORBENTS HAVING A CROSS-LINKED POLY (VINYL ALCOHOL) MATRIX BY THE USE OF COLD WATER

Figure 6:
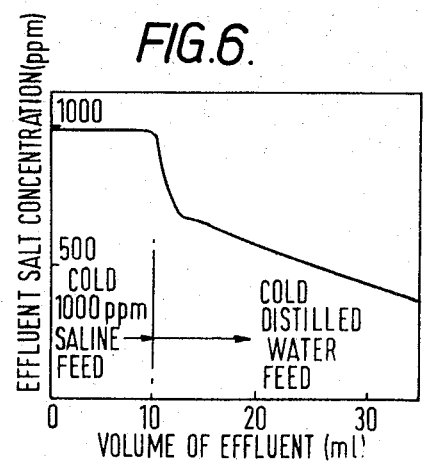

A composite resin containing "Amberlite IRA-93" particles of ca 1$\mu$ size and "Zeo-Karb 226" particles —10$\mu$ in size, embedded in a matrix of poly (vinyl alcohol) cross-linked with 20 mol. percent glutaraldehyde, based on the free hydroxy group of the poly (vinyl alcohol) having a total matrix content was ca 40% by weight, was equilibrated in 1000 p.p.m. saline at pH 7.4 and ca 20° C. It was found possible to remove some of the adsorbed salt by merely washing the resin with distilled water at ambient temperature. A bed of 20 ml. of the resin was washed with water at a flow rate of 6 ml./min. FIG. 6 shows the sharp drop in conductivity of the effluent as the 1000 p.p.m. saline is displaced from the voids in the bed, followed by a gradual change as the adsorbed ions are removed from the exchange sites. This results from the weaker electrolyte behaviour of the ion exchange particles in the environment of lower salt concentration, which causes the salt forms of the particles to become more hydrolysed thus releasing the adsorbed ions.

The elution was continued until the effluent had a conductivity of 3 micromho cm.$^{-1}$. The composite adsorbent thus regenerated at ambient temperature had released salt to the extent of 0.076 meq./ml. of bed. A further quantity of salt (0.084 meq./ml.) can be removed by then increasing the temperature during the regeneration to 80° C., giving a total removal of 0.16 meq./ml.

EXAMPLE 6.—ANTI-FOULING PROPERTIES OF COMPOSITE ADSORBENTS HAVING A CROSS-LINKED POLY (VINYL ALCOHOL) MATRIX

It has been found that composite adsorbent beads comprising ion exchange particles of the "De-Acidite G" and "Zeo-Karb 226" type embedded in a 20% cross-linked poly (vinyl alcohol) matrix, prepared by reaction of the polymer with glutaraldehyde, do not adsorb organic foulants, of the humic acid type from highly coloured ground waters. Thus no fouling resulted when adsorbent beads were treated with 10,000 bed volumes of a water rated at 100 colour units.

Further tests of matrix materials prepared by the same method but not incorporating ion exchange particles and reacted with sufficient glutaraldehyde to cross-link 20, 40 or 60% of the hydroxy groups of the poly (vinyl alcohol) indicated that the matrix possesses an overall negative charge which probably arises from the oxidation of pendant aldehyde groups to carboxylic acid residues. For example, after 10 min. exposure to dye solution, cationic dyes such as Methylene Blue, Rhodamine G, Brilliant Green, Chrysoidine, Bismarck Brown, Crystal Violet and Saframine O, were strongly adsorbed by the 20% cross-linked beads, but were not adsorbed by the 40% (with the exception of Methylene Blue and Bismarck Brown, which were slightly adsorbed) or the 60% cross-linked. However, the anionic dyes Chicago Blue, Erythrosin A, Eosin, Naphthol Green B, Erio flavine, Brilliant Yellow, Aurentia Imperial Yellow, Methyl Orange, Soluble Blue, Nitrazine Yellow and Rosinduline, were only weakly adsorbed on the 20% cross-linked poly (vinyl alcohol) beads, and not at all by the 40 or 60% cross-linked material.

The presence of anionic groups on the network of the matrix would account for the resistance of the composite adsorbent to fouling by the large organic anions found in coloured waters. The influence of cross-linking on the adsorption of dyes also indicates that the pore size of the matrix becomes increasingly smaller as the degree of cross-linking is increased.

EXAMPLE 7.—PREPARATION OF COMPOSITE ADSORBENTS BASED ON POLYVINYL ALCOHOL MATRICES (METHOD B)

(a) A solution of terephthaldehyde (1.1 g.) in acetone (10 ml.) was added to a stirred solution of "Elvanol 50-42" (8 g.; a high molecular weight polyvinyl alcohol containing 12% residual acetate groups and manufactured by E. I. du Pont de Nemours and Co.) in water (200 ml.) and acetone (90 ml.). With continuous stirring, 10 ml. of a wet settled suspension of 5-10$\mu$ diameter beads of "Zeo-Karb 226" in the hydrogen form were added, followed by 10 ml. of a wet settled suspension of 10-20$\mu$ diameter beads of "De-Acidite G" in the chloride form. The pH of the stirred suspension was then reduced to 1.0 by dropwise addition of concentrated hydrochloric acid. Within 10 min. the suspension had gelled, at which stage stirring was discontinued and the mixture allowed to cure for 18 hr. at ambient temperature. The rubbery gel was broken up to —10 mesh, washed by decantation with water until the supernatant was only faintly acid, and suspended in water (500 ml.) at 60° C. Sodium hydroxide (0.1 N) was then added until the pH had risen to 4, after which the gel was stirred at 60° C. for 10 minute periods with successive portion of water (500 ml.) until only traces of chloride ion were detected in the supernatent. The gel particles were separated and partially dehydrated by three successive treatments with 500 ml. portions of acetone, followed by drying at ambient temperature and 20 mm. Hg pressure. After a final cure for 2 hr. at 110° C. the resin was obtained as hard yellow particles (15.3 g.) which doubled in volume but did not crack on immersion in water or 0.1 N sodium hydroxide solution. Microscopic examination showed the particles to consist of ion-exchange resin beads embedded in a swollen gel.

Figure 7:
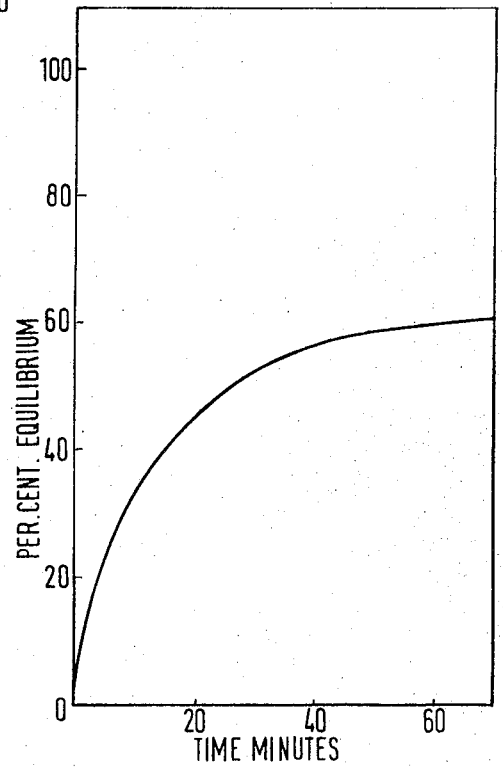

(b) The composite resin was equilibrated in 1000 p.p.m. saline and the pH adjusted to 5.0 by the addition of alkali. The resin was then column washed with cold water until a chloride free effluent was obtained. Both resin and influent water were heated to 80° C. and washing continued until the conductivity of the effluent was below 5 micro-mho cm.$^{-1}$. The rate of salt uptake at 25° C. by the regenerated resin is shown in FIG. 7. The effective capacity of the system was 0.6 meq./g.

EXAMPLE 8.—PREPARATION OF COMPOSITE ADSORBENT BASED ON POLYVINYL ALCOHOL MATRICES (METHOD C)

To a stirred solution of 8 g. of a polyvinyl alcohol ("Elvanol 50–42"; E. I. Du Pont de Nemours and Co.) in water (200 ml.) was added 11 ml. of a wet settled suspension of "De-Acidite G" (choride form; 10–20μ diameter beads) followed by 11 ml. of a wet settled suspension of "Zeo-Karb 226" (hydrogen form; 5–10μ diameter beads). A 25% aqueous solution (3.7 ml.) of glutaraldehyde was then introduced. Hydrochloric acid was added to the stirred suspension until the pH fell to 1. Within 10 min. gelation occurred, at which stage stirring was discontinued and the reaction allowed to proceed at ambient temperature for 30 min. The temperature was then raised to 60° C. and maintained at that level for a further 30 min. The rubbery gel thus produced was broken up to −10 mesh before washing and recovery by the procedure described in Example 7. The final product was a hard resin (16 g.) similar in properties to the material described in Example 7.

EXAMPLE 9.—PREPARATION OF COMPOSITE ADSORBENT BASED ON POLYVINYL ALCOHOL MATRICES (METHOD D)

Dry "De-Acidite G" (5 g.; free base, 10–20μ diameter beads) and dry "Zeo-Kark 226" (5 g.; sodium form, 5–10μ diameter beads) were successively added with stirring to a solution of triallyl cyanurate (5 g.) in redistilled vinyl acetate (16 g.) containing d,d'-azobisisobutyronitrile (0.2 g.). The stirred suspension was heated under nitrogen for 18 hr. at 60° C. until polymerization was complete. The hard polymer was broken up to −10 mesh and extracted with boiling ethanol to remove residual monomer and traces of linear polymer. Conversion of the cross-linked poly (vinyl acetate) matrix to a cross-linked poly (vinyl alcohol) matrix was achieved by allowing the polymer to react with methanol (100 ml.) containing sodium methoxide (0.5 g.) for 4 hr. at 50° The resultant polymer, after extraction with methanol and water, was dried to yield a hard resin (20 g.) consisting of ion-exchange beads embedded in a matrix of cross-linked poly (vinyl alcohol). The properties of this material were similar to those of the product described in Example 7.

The initial polymerization was also carried out in suspension, using a 0.05% aqueous solution of poly (vinyl alcohol) buffered to pH 5 as the suspending medium. In this case the product was obtained in the form of beads, 80–160μ in diameter, which were converted to cross-linked poly (vinyl alcohol) beads by a method similar to that employed above for the bulk-polymerized material.

EXAMPLE 10.—PREPARATION OF COMPOSITE ADSORBENTS BASED ON POLY (VINYL ALCOHOL) MATRICES (METHOD E)

The procedure described in Example 9 (method C) was repeated except that the triallyl cyanurate (5 g.) was replaced by pentaerythritol triallyl ether (5.2 g.). The final product was a hard resin (21 g.) similar in properties to the material prepared by the method of Example 9.

EXAMPLE 11.—PREPARATION OF COMPOSITE ADSORBENTS BASED ON POLYANION-POLYCATION ("POLYSALT") MATRICES (a) Polymers containing ionically cross linked matrices were prepared by mixing stoichiometric amounts of cationic and anionic polyelectrolytes in the manner described by A. S. Michaels and R. G. Miekka [J. Phys. Chem., 65, 1765 (1961)]. In the general procedure, a 5% solution containing 17 meq. of polyvinylbenzyltrimethylammonium chloride was mixed with a 5% solution containing 17 meq. sodium polystyrenesulphonate. The mixture was diluted to 3 l. and the precipitated polysalt separated by centrifugation. It was washed with a further two 3 l. portions of water, the washings being separated by decantation from the centrifuged polymer. The polysalt was then evaporated to dryness by heating under reduced pressure on a steam bath. Polysalts were prepared from polyvinylbenzyltrimethylammonium chlorides of molecular weights 500,000 (degree of substitution 0.57) and 20,000 (degree of substitution 0.74), and from sodium polystyrenesulphonates of molecular weight 50,000 and degrees of substitution of 0.61, 0.77 and 0.88. They were also prepared from the commercially available polyelectrolytes "Primafloc C–5" (Rohm and Haas: cationic) and "Purifloc A21" (Dow: anionic). The polysalts were soluble in the ternary mixture water-sodium bromide-acetone (55:30:15 by weight).

(b) The composite resins were prepared by mixing ion-exchange beads of 10–20 microns diameter in a solution of the polysalt in the ternary solvent so that a thin slurry was obtained. This was dispersed in an oil suspending medium and the volatile components of the ternary solvent removed, so that the polysalt was deposited around the micro beads, and a conglomerate of overall particle size in the range 100–2000 microns was obtained. The preparative details were as follows:

16.5 ml. of 10–20 micron grade "Zeo-Karb 226" (a weak acid resin) and 16.5 ml. of 10–20 micron grade "De-Acidite G" (a weak base resin)—each resin being in the undissociated form, and the volumes being measured as wet settled volumes—were added to 2 to 5% w./v. solutions of the polysalt in 40–100 ml. of the ternary mixture, the concentration and amount of solution being varied so that a conveniently mobile slurry could be obtained over the range of matrix contents studied. The equal volumes of the two types of resins were calculated to give an acid to base resin equivalent ratio of 2.5; this is the optimum for desalting salt solutions of 100 p.p.m. using thermal regeneration at 80°, provided that the pH during adsorption at ambient temperature is 5.8.

The slurry of resins in the polysalt solution was added in one portion to 200 ml. of paraffin oil (Shell "Ondina 33") containing 2 g. of the oil soluble surfactant ethyleneglycol dilaurate ("Glyco S–235") and dispersed by stirring with a serrated disc stirrer at 800 r.p.m. Air was swept over the surface of the dispersion at room temperature for 2 hrs., followed by 2 hrs. at 50° C., and 2 hrs. at 80° C., to effect the gradual removal of the acetone and some of the water of the ternary solvent. After cooling, the composite resin particles were filtered off, washed thrice with hexane to remove the oil, then three times with acetone to remove the hexane, and finally with water. The particles were sucked dry on the filter until a freely flowing resin resulted, and the 14–52 B.S. mesh fraction was sieved out.

The ion-exchange resin particles within the composite particle now being present in the sodium and bromide forms, the composite particles were washed in a column with 40 bed volumes of 5% w./v. saline to convert the amine resin to the chloride form. When a composite resin of this type was equilibrated with 1000 p.p.m. saline the equilibrium pH was 5.7. The resin was water washed until a chloride free effluent was obtained. It was then placed in a jacketed column and heated to 80° C., and distilled water passed through the column until the conductivity of the effluent was 5 micro-mho cm.$^{-1}$ or lower. The thus thermally regenerated resin was stored under water. A summary of the resins prepared in the above described manner is given in Table III.

The data shown in Table III indicates that the composite resins of greatest mechanical strength are obtained when polyelectrolytes of high degree of substitution are used in the preparation of the polysalt; that is, when there are the greatest number of ionic cross-links present in the polysalt. Usually an increase in the polysalt content enhances mechanical strength also. These trends may be nullified if too high a stirring rate is maintained in the suspension stage, when the major effect is maceration of the conglomerates.

in a finely divided form it is advantageous to use them in magnetic form so that the magnetic properties can be

TABLE III.—COMPOSITE RESINS WITH POLYSALT MATRIX

| Matrix details | | | | Matrix content, wt. percent | Matrix solvent | Remarks |
|---|---|---|---|---|---|---|
| Cationic | | Anionic | | | | |
| M.W. | DS[1] | M.W. | DS | | | |
| 500,000 | 0.57 | 500,000 | 0.61 | 10 | Slurry [2] | Soft conglomerates. |
| 500,000 | 0.57 | 500,000 | 0.61 | 16 | Ternary | Soft particles, harder when dried, but some broke up on wetting. |
| 500,000 | 0.57 | 500,000 | 0.61 | 16 | Quaternary [3] | Do. |
| 500,000 | 0.57 | 500,000 | 0.61 | 18 | Ternary | Very soft particles. |
| 500,000 | 0.57 | 500,000 | 0.61 | 28 | ___do___ | Pliable, less readily fragmented particles. |
| 500,000 | 0.57 | 500,000 | 0.61 | 43 | ___do___ | Harder conglomerates. |
| 500,000 | 0.57 | 500,000 | 0.77 | 28 | ___do___ | Reasonably hard conglomerates. |
| 20,000 | 0.74 | A-21 | | 19 | ___do___ | Soft particles. |
| 20,000 | 0.74 | 500,000 | 0.77 | 28 | ___do___ | Hard spherical conglomerates. |
| 20,000 | 0.74 | 500,000 | 0.77 | 37 | ___do___ | Stirred at 1,200 r.p.m., and heated for 4 hr. in the 80° C. stage, to yield soft, fine particles. Salt forms of resins used initially. |
| 20,000 | 0.74 | 500,900 | 0.88 | 28 | ___do___ | Large soft conglomerates; also stirred at 1,200 r.p.m. |
| C-5 | | A-21 | | 26 | ___do___ | Resins used in salt form; soft conglomerates. |

[1] Degree of substitution.
[2] The polysalt was a finely divided from (0.6 g.) slurried in 15% w./v. CaBr₂ solution (50 ml.). Half the quantities of resins described in the general preparation were employed.
[3] The polysalt (2.1 g.) was dissolved in 73 ml. of the quaternary mixture made from hydrochloric acid (151 ml.), dioxane (173 ml.), water (44 ml.), and dimethylsulphoxide (9 ml.). The resins were initially in their salt forms.

Figure 8:
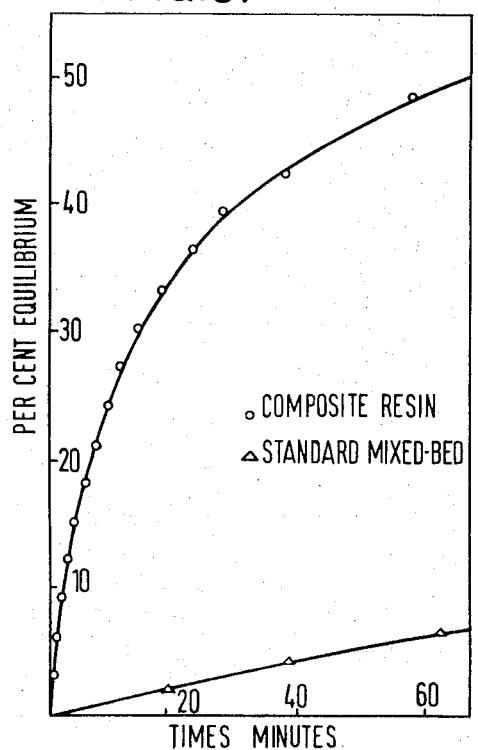

(c) The rate of salt uptake at 19° C. by a composite resin possessing a matrix (28 wt. percent) composed of the polysalt prepared from polyvinylbenzyltrimethylammonium chloride (molecular weight 500,000; degree of substitution 0.57) and sodium polystyrenesulphonate (molecular weight 500,000; degree of substitution 0.61) is shown in FIG. 8. Also shown are the results obtained with a conventional mixed bed of the same resins, "De-Acidite G" and "Zeo-Karb 226," in 14–52 mesh bead form. These resins were regenerated thermally by the same technique employed for the composite resin. It can be seen that the composite resin particles adsorb ions at ca. 50 times the rate observed for the standard resins. The effective capacities of the two systems were 0.7 and 0.5 meq./g. respectively for the composite adsorbent and the mixed resins.

EXAMPLE 12.—THERMAL REGENERATION OF COMPOSITE ADSORBENTS HAVING A POLYSALT MATRIX AND THEIR USE IN DESALINATION

Figure 9:
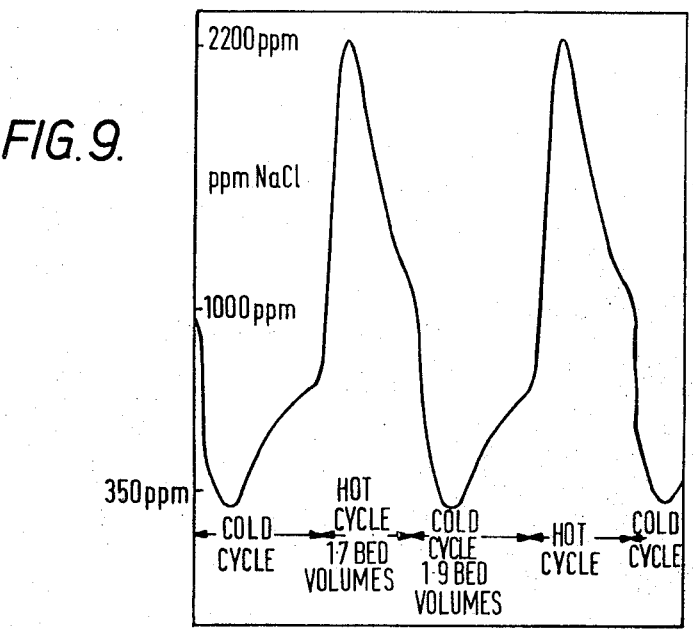

Equal volumes of 10–20 micron grade "Zeo-Karb 226" and 10–20 micron grade "De-Acidite G" were incorporated by the method outlined in the preceding example, in a 16% matrix composed of the polysalt prepared from polyvinylbenzyltrimethylammonium chloride (molecular weight 500,000 and degree of substitution 0.57) and sodium polystyrene sulphonate (molecular weight 500,000 and degree of substitution 0.61). 19 ml. of the resin was equilibrated in a salt solution to a pH value of 5.8 and then packed into a column where alternatively cold (ca. 20° C.) and hot (80° C.) solutions containing 1000 p.p.m. sodium chloride were passed down through the bed at a flow rate equivalent to 0.6 gal./cu. ft./min. As can be seen from FIG. 9, salt was adsorbed in the 35 minute cold cycle and released in the 30 minute hot cycle according to the principles disclosed in Australian Pat. No. 274,029 and patent application No. 59,441/65.

EXAMPLE 13.—MAGNETIC COMPOSITE ADSORBENT HAVING A POLYSALT MATRIX

Magnetic composite resins having ionically cross-linked matrices were prepared by the method described in Example 11 except that, in addition to the ion exchange resins, gamma ion oxide was added to the solution of the polysalt.

Figure 10:
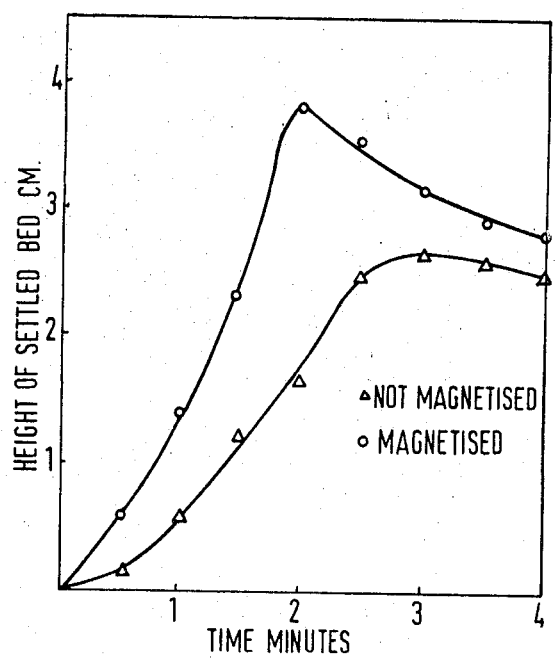

FIG. 10 compares the rate of settling of 18 mls. of such a composite magnetic resin (—200 mesh) and containing 13% of the iron oxide in a water slurry with a total volume of 100 ml. In accordance with the principles outlined in Australian patent application 20,648/67 it can be seen that magnetisation of the particles by passage of the slurry through a tube within a magnetised solenoid accelerates settling of the particles. Since the rate of reaction of a composite resin benefits by using the particles in a finely divided form it is advantageous to use them in magnetic form so that the magnetic properties can be utilised to simplify the mechanical problems of using finely divided resins and full advantage can be taken of the fast kinetics of such resins. Magnetic flocculation is one of several methods described in the above mentioned patent application for handling magnetic adsorbents. As shown in that patent, faster settling of the magnetically flocculated particles can be achieved by increasing the amount of magnetic iron oxide within the particles.

EXAMPLE 14.—WEIGHTED COMPOSITE ADSORBENT

In this series of experiments water was passed up through a bed of 30–42 mesh BSS ion exchange resin at an increasing velocity and the fluidisation velocity at which the bed began to expand was noted. The fluidisation velocity of a bed of standard resin is compared in Table IV with a composite resin prepared in the preceding example and containing 40 weight percent of gamma iron oxide.

TABLE IV

| | S.G. | Fluidisation velocity, cm./min. |
|---|---|---|
| Standard resin | 1.04 | 0.5 |
| Composite adsorbent, 40% Fe₂O₃ | 1.70 | 1.6 |

It therefore follows that the weighted resin can be regenerated upflow more readily than can the standard resins. Thus the mechanical feasibility of employing a weighted composite adsorbent in reverse-flow regeneration procedures is demonstrated.

EXAMPLE 15.—PREPARATION OF A COMPOSITE ADSORBENT HAVING A POLYSALT MATRIX OF IMPROVED MECHANICAL STRENGTH

In the types of systems under study, an aqueous medium containing salt will provide microions to partially shield the changes on the polysalt structures so that some breaking of crosslinks accompanied by swelling and softening of the polysalts is highly likely. The resulting composite resins are therefore not strong mechanically as shown in Table V. Polysalts may be incorporated into physically strong polymers to improve their permeability. The latter approach has been used to enhance the permeability of polyurethane and PVC films, a five-fold improvement being obtained with respective polysalt loadings of 30 and 15% by weight.

We have now found a method whereby some covalent crosslinks can be introduced into polysalt systems with a polyethyleneimine component. Matrix materials of this type are insoluble in the usual multicomponent solvents, and even in 0.5 N sodium hydroxide. Since alkali treatment would remove the charges on the polyethyleneimine molecules by deprotonation, and thus eliminate any ionic cross-links to yield two water soluble polyelectrolytes, the formation of stable covalent cross-links is indicated. A possible route for the formation of such cross-links is dehydration of secondary amine sulphonate links to produce a tertiary sulphonamide grouping. Insolubility of the polysalt in alkali shows that the crucial cross-links must be tertiary and not secondary sulphonamide groups since the latter are alkali soluble.

This technique can be used to prepare composite resins having a matrix which is both ionically and covalently cross-linked. A solution of the polysalt in the usual ternary mixture can be readily obtained by mixing stoichiometric amounts of the two polyelectrolytes, each dissolved in the ternary mixture. The secondary cross-linking reaction does not take place under these conditions, but can be achieved by heat treatment of the final composite resin. A preparation was carried out along the following lines:

Polyethyleneimine of MW 60,000 (Dow "Montrek 600" 5.8 g. of a 33% solution, or 45.5 meq.) was treated with hydrochloric acid until the pH was 7.0. Independent titrations under these conditions showed that the fraction of basic groups protonated is 0.31 (14 meq.). The total volume of the solution was noted (18.5 ml.) and acetone (6.4 ml.) and sodium bromide (10.1 g.) added to bring the solution to the normal ternary mixture proportions. To the mixture was added the stoichiometric amount (14 meq.) of ammonium polystyrenesulphonate of MW 130,000 and DS -.0 dissolved in the ternary solvent (20 ml.). The composite absorbent synthesis was followed as described in Example 11, except that a subsequent heat treatment at 100° was continued for 4 hours during the stirring and evaporation stage. The produce worked up in the normal way was in the form of soft particles which became quite hard when heated in an air oven at 120° C. for 2 hours.

Attrition tests carried out at 20° C. over 3 days showed that the composite resin had improved mechanical strength relative to the normal polysalt matrix composite adsorbent as illustrated in Table V, the preformance being almost as good as that of a composite adsorbent prepared with a cross-linked poly(vinyl alcohol) matrix by the method of Example 8.

TABLE V.—ATTRITION TESTS AT 20° C. ON COMPOSITE ADSORBENTS CONTAINING A POLYSALT MATRIX

[Resins prepared as in Example 11 (usually polystyrene based polyelectrolytes). Particles size 14–52 mesh BSS.]

| Matrix details | | | | Matrix content, weight percent | Percentage breakup after 3 days |
|---|---|---|---|---|---|
| Cationic | | Anionic | | | |
| M.W. | DS | M.W. | DS | | |
| 500,000 | 0.57 | 500,000 | 0.61 | 16 | 28 |
| | | | | 28 | 17 |
| | | | | 43 | 3 |
| 500,000 | 0.57 | 500,000 | 0.77 | 28 | 63 |
| 20,000 | 0.74 | 500,000 | 0.77 | 28 | 13 |
| | | | | 28 | 19 |
| | | | | 37 | 47 |
| 20,000 | 0.74 | 500,000 | 0.88 | 28 | 11 |
| 20,000 | 0.74 | 130,000 | 1.0 | 28 | 56 |
| ¹ 200,000 | 0.93 | 130,000 | 1.0 | 28 | 33 |
| ² 60,000 | 0.31 | 130,000 | 1.0 | 28 | 8 |
| (³) | | | | 34 | 3 |

¹ Poly(4-vinyl-N-n-butylpyridinium bromide) otherwise after the method of Example 11.
² Poly(ethyleniminium chloride) using the preparative details described in this example.
³ Cross linked poly (vinyl alcohol) prepared as in Example 8.

EXAMPLE 16.—PREPARATION OF COMPOSITE ADSORBENTS BASED ON CELLULOSE DERIVATIVE MATRICES

Figure 11:
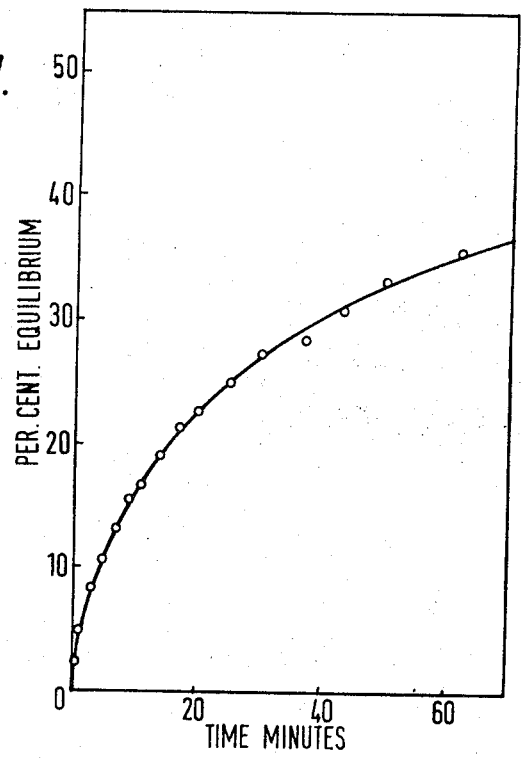

The same general procedure was followed as in Example 11, except that the matrix material, in this case cellulose monoacetate or ethyl cellulose, was dissolved in acetone, and the micro resin beads slurried in the resulting solution prior to dispersion in the oil phase. The resins were employed in their salt forms, the preparative details being as follows:

16 ml. of micrograde "Zeo-Karb 226" in the sodium form and 9 ml. of micrograde "De-Acidite G" in the chloride form were sucked dry on the filter and added to a solution of the cellulose derivative (2.1 g.) in acetone (75 ml.). The slurry was added in one lot to 200 ml. of paraffin oil containing 2 g. of ethylene glycol, and dispersion effected by stirring the mixture with a serrated disc stirrer at 800 r.p.m. The acetone was evaporated off by passing air oven the surface of the suspension for 2 hr. at room temperature, followed by 2 hr. at 50° C. The product was then worked up as described in Example 11, except that acetone washing was not carried out. In the two cases studied, using the matrices of cellulose derivatives cellulose monoacetate and ethyl cellulose, the composite adsorbents were obtained in bead form, that with the latter matrix being the harder. As before, the "Zeo-Karb 226" and "De-Acidite G" were present in the equivalent ratio of 2.5:1. Equilibration of the cellulose monoacetate matrix beads in 1000 p.p.m. saline yielded a supernatant solution of pH 5.6. This resin, when thermally regenerated, was found to adsorb salt rapidly at 25° C., as shown in the rate curve depicted in FIG. 11. The effective capacity of the resin was 0.7 meq./g.

We claim:
1. A composite ion exchange adsorbent capable of being regenerated by elution with water or saline aqueous solutions at a temperature exceeding that employed in the adsorption stage, said adsorbent being in the form of composite particles in the size range of about 50 to about 2000 microns, each composite particle thereof comprising particulate acidic and basic ion exchange resins having a particle size of about $\frac{1}{10}$ to $\frac{1}{1000}$ of the size of the composite particles, dispersed in a homogeneous matrix of a water-insoluble polymeric material selected from the group consisting of ionically cross-linked polyelectrolytes and cross-linked polymers having neutral hydrophylic functional groups, said polymeric material being permeable to ions and water.

2. An adsorbent as claimed in claim 1, wherein the matrix is a cross-linked polymer consisting essentially of units selected from the group consisting of vinyl alcohol and functional derivatives thereof.

3. An adsorbent as claimed in claim 2, wherein the polymer is a poly (vinyl alcohol) cross-linked with an agent selected from the group consisting of glutaraldehyde, terephthalaldehyde and formaldehyde.

4. An adsorbent as claimed in claim 7, wherein said poly (vinyl alcohol) is cross-linked with glutaraldehyde in an amount equivalent to about 20 to about 60 mol. percent of the free hydroxyl groups of the poly (vinyl alcohol).

5. An adsorbent as claimed in claim 1, wherein the matrix is an ionically cross-linked polyanion-polycation complex.

6. An adsorbent as claimed in claim 9, wherein the polycation is selected from the group consisting of poly (vinyl benzylamine) and N-substituted derivatives thereof, polyethyleneimine and N-substituted derivatives thereof, polyvinylpyridine, poly (dimethylaminoethyl methacrylate), quaternised poly (dimethylaminoethyl methacrylate) and quaternised polyvinylpyridine.

7. An adsorbent as claimed in claim 9, wherein the polyanion is selected from the group consisting of sodium poly (styrenesulphonate), sodium poly (vinyltoluenesulphonate), sodium polyacrylate, sodium polymethacrylate, sodium salts of the hydrolysed copolymers of styrene and maleic anhydride, sodium polyvinylsulphonate and the corresponding water soluble free acids, and the corresponding salts of other alkali metals.

8. An adsorbent as claimed in claim 9, wherein the polycation is a poly (vinylbenzyltrimethylammonium chloride and the polyanion is a sodium poly (styrenesulphonate).

9. An adsorbent as claimed in claim 9, wherein the polycation is a polyethyleneimine and the complex includes covalent cross-links.

10. An adsorbent as claimed in claim 1, wherein the matrix is a cellulose derivative selected from the group consisting of cellulose acetate, cellulose triacetate, methylcellulose, ethyl cellulose, hydroxyethyl cellulose, cellulose nitrate and regenerated cellulose formed by acid treatment of cellulose xanthate.

11. An adsorbent as claimed in claim 1, having a particle size in the range of about 300 to 1200 microns.

12. An adsorbent as claimed in claim 1, wherein the ion exchange resins have a particle size in the range of about 0.5 to about 20 microns.

13. An adsorbent as claimed in claim 1, wherein the ion exchange resins comprise up to about 70% by weight of the composite particles.

14. An adsorbent as claimed in claim 1 wherein the acidic ion exchange resin is a carboxyl ion resin and the basic ion exchange resin is an amine resin.

15. An adsorbent as claimed in claim 1, wherein the physical characteristics of the acidic and basic ion exchange resins are selected to achieve approximately equal exchange rates.

16. An adsorbent as claimed in claim 1 and further comprising a particulate substance added to modify the density or magnetic properties of the composite.

17. A method of producing the composite ion exchange adsorbent of claim 1 in the form of particles in the size range of about 50 to about 2000 microns, comprising the steps of forming a dispersion of particulate acidic and basic ion exchange resins having a particle size of about $\frac{1}{10}$ to $\frac{1}{1000}$ of the size of the composite particles, in a solution of a water-insoluble ion-permeable polymeric material selected from the class consisting of ionically cross-linked polyelectrolytes and cross-linked polymers having neutral hydrophilic functional groups, and precursors of such materials in an aqueous solvent, further dispersing said dispersion in an oil medium which is immiscible with the solution, and removing at least a part of said solvent, thereby to produce discrete particles of said polymeric material in which said ion exchange resins are dispersed.

18. A method of producing the composite ion exchange absorbent of claim 1 in particulate form, comprising the steps of forming a dispersion of particulate acidic and basic ion exchange resins having a particle size of about $\frac{1}{10}$ to $\frac{1}{1000}$ of the size of the composite particles, in a medium comprising a three-dimensionally cross-linkable polymeric material selected from the group consisting of polyelectrolytes and polymers having hydrophilic functional groups, bringing about cross-linking of the polymeric material to form a homogeneous matrix having said particulate ion exchange resins dispersed therein, and reducing said matrix to the form of particles in the size range of about 50 to about 2000 microns.

19. A method as claimed in claim 18, wherein said medium comprises a solution of said polymeric material in an aqueous solvent system, and wherein prior to cross-linking the polymeric material, said dispersion is further dispersed in an oil medium which is immiscible with said solution, whereby said matrix is produced in the form of discrete particles in which said ion exchange materials are dispersed.

20. A method of producing the composite ion exchange adsorbent of claim 1 in particulate form, comprising the steps of dispersing particulate acidic and basic ion exchange resins having a particle size of about $\frac{1}{10}$ to $\frac{1}{1000}$ of the size of the composite particles, in a medium comprising a poly(vinyl alcohol), a cross-linking agent therefor and a suitable solvent, causing or allowing the poly(vinyl alcohol) to cross-link thereby to form a matrix consisting essentially of a cross-linked poly(vinyl alcohol) in which said ion exchange resins are dispersed, and reducing said matrix to the form of particles in the size range of about 50 to about 2000 microns.

21. A method as claimed in claim 20, wherein the composite absorbent is subjected to a heat treatment to enhance the mechanical strength of the matrix.

22. A method as claimed in claim 20, wherein the composite adsorbent in further reacted with a cross-linking agent selected from the group consisting of formaldehyde, glutaraldehyde, glyoxal or terephthalaldehyde thereby to enhance the mechanical strength of the matrix.

23. A method of producing the composite ion exchange adsorbent of claim 1 in particulate form, comprising the steps of dispersing particulate acidic and basic ion exchange resins having a particle size of about $\frac{1}{10}$ to $\frac{1}{1000}$ of the size of the composite particles, in a solution of a polyanion and a polycation in a ternary solvent system consisting of aqueous sodium bromide and a polar organic solvent, thereby to form a slurry, dispersing said slurry in an oil phase and removing the solvent from the slurry, thereby to form discrete particles in the size range of about 50 to about 2000 microns of a matrix consisting essentially of an ionically cross-linked polyanion-polycation complex in which said ion exchange materials are dispersed.

24. A method as claimed in claim 23, wherein said composite adsorbent is subjected to a further treatment to introduce covalent cross-links into the matrix.

25. An adsorbent as claimed in claim 14, wherein the carboxyl ion exchange resin is selected from the group consisting of polyacrylate and polymethacrylate resins and the amine resin is a tertiary amine resin.

26. A method, as claimed in claim 17, wherein the acidic and basic ion exchange resins are carboxyl and amine ion exchange resins respectively.

27. A method, as claimed in claim 18, wherein the acidic and basic ion exchange resins are carboxyl and amine ion exchange resins respectively.

28. A method, as claimed in claim 20, wherein the acidic and basic ion exchange resins are carboxyl and amine ion exchange resins respectively.

29. A method, as claimed in claim 23, wherein the acidic and basic ion exchange resins are carboxyl and amine ion exchange resins respectively.

30. A composite particulate ion exchange adsorbent for the demineralisation of water comprising particulate weak acid and weak base ion exchange resins dispersed in a homogeneous matrix of cross-linked poly (vinyl alcohol), said absorbent having a particle size of from about 50 to 2000 microns and said ion exchange resins having particle sizes of about $\frac{1}{10}$ to $\frac{1}{1000}$ of the size of the composite particles.

References Cited

UNITED STATES PATENTS

| 2,642,514 | 6/1953 | Herkenhoff | 210—24 |
| 3,244,687 | 4/1966 | Spindler | 260—94.9 |
| 3,284,238 | 11/1966 | White | 136—86 |

FOREIGN PATENTS

| 20,828 | 10/1963 | Japan. |

OTHER REFERENCES

Michaels, Ind. Eng. Chem. 57, 37 (1965).

MELVIN GOLDSTEIN, Primary Examiner

U.S. Cl. X.R.

210—24, 30; 260—2.1 E